(12) United States Patent
Tsai

(10) Patent No.: US 8,638,557 B2
(45) Date of Patent: Jan. 28, 2014

(54) MOBILE ELECTRONIC DEVICE HOLDER

(76) Inventor: Wen-Feng Tsai, Taipei (TW)

( * ) Notice: Subject to any disclaimer, the term of this patent is extended or adjusted under 35 U.S.C. 154(b) by 193 days.

(21) Appl. No.: 13/373,967

(22) Filed: Dec. 7, 2011

(65) Prior Publication Data

US 2013/0148273 A1 Jun. 13, 2013

(51) Int. Cl.
*H05K 5/00* (2006.01)
*H05K 7/00* (2006.01)
*G06F 3/02* (2006.01)

(52) U.S. Cl.
USPC ............ 361/679.56; 361/679.29; 361/679.43; 361/679.57; 361/679.58; 248/919; 345/169

(58) Field of Classification Search
USPC ............ 361/679.01–679.09, 679.41–679.45, 361/679.55–679.59, 825, 679.26–679.3; 345/156, 157, 168, 169; 248/917–924
See application file for complete search history.

(56) References Cited

U.S. PATENT DOCUMENTS

| 8,109,479 B1* | 2/2012 | Tsai | 248/206.3 |
| 2011/0024587 A1* | 2/2011 | Tsai | 248/206.2 |
| 2011/0062299 A1* | 3/2011 | Tsai | 248/231.41 |

* cited by examiner

*Primary Examiner* — Jayprakash N Gandhi
*Assistant Examiner* — Jerry Wu

(57) ABSTRACT

A mobile electronic device holder includes an upper holder frame shell, a bottom holder frame shell attached to the bottom side of the upper holder frame shell, three first clamping members respectively slidably mounted in respective sliding ways of the bottom holder frame shell for holding a mobile electronic device, a gear wheel rotatable to move the first clamping members in and out of the upper and bottom holder frame shells, a retractable second clamping member slidably mounted in one sliding way of the bottom holder frame shell and adjustable to one of a series of length.

3 Claims, 6 Drawing Sheets

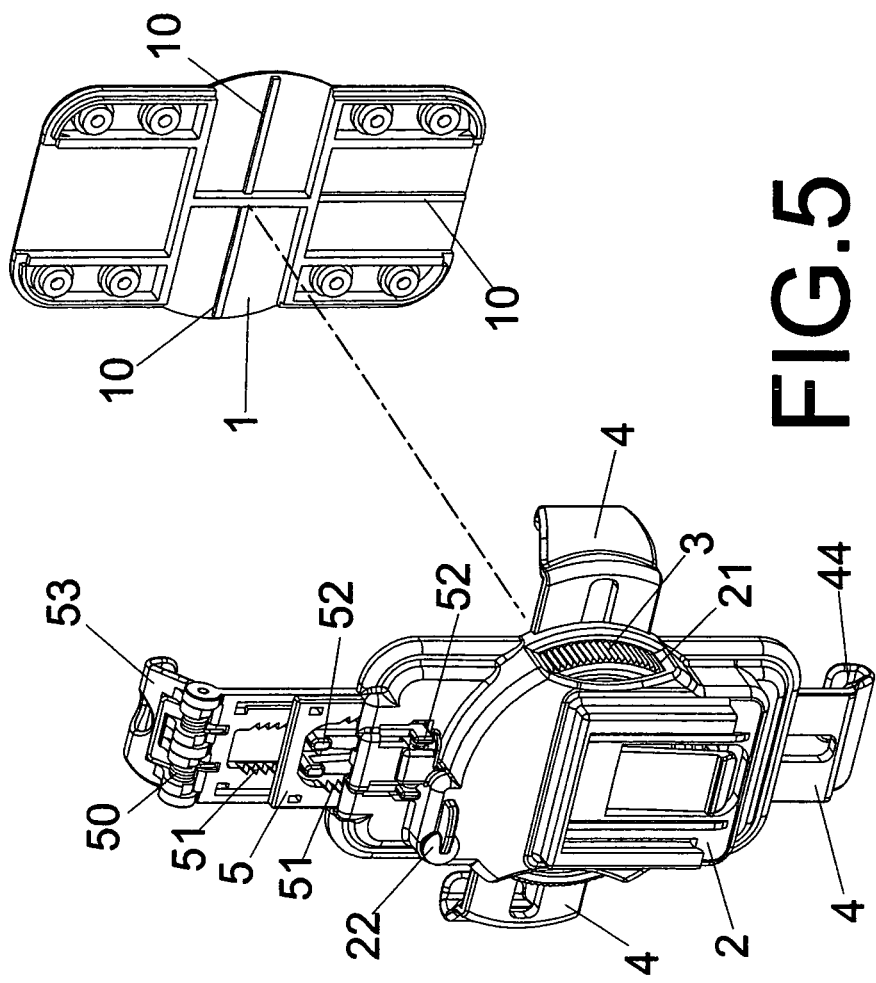

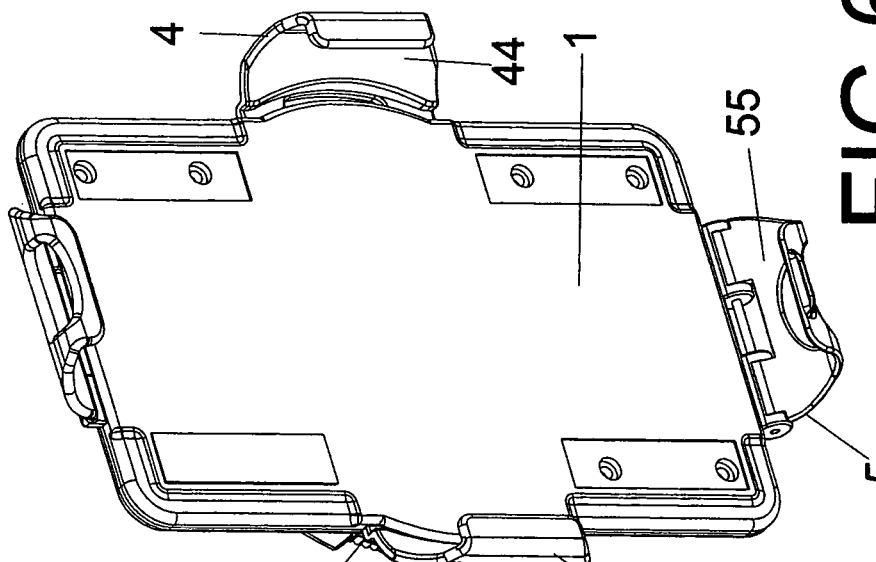
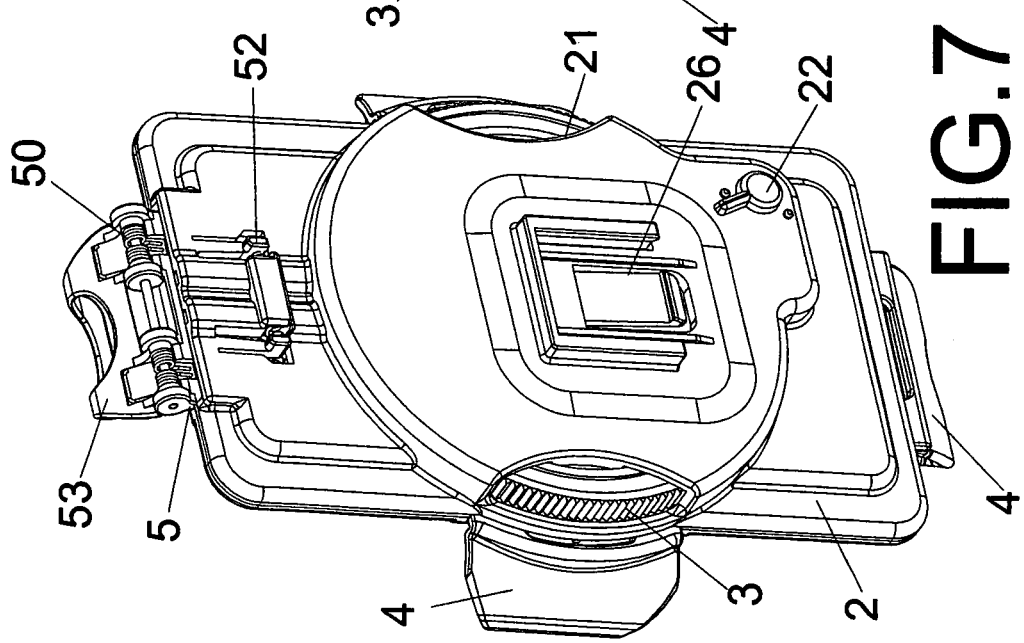

MOBILE ELECTRONIC DEVICE HOLDER

BACKGROUND OF THE INVENTION

1. Field of the Invention

The present invention relates to a holding apparatus for use in, for example, a vehicle, to hold a mobile electronic device and more particularly, to a mobile electronic device holder, which includes an upper holder frame shell, a bottom holder frame shell attached to the bottom side of the upper holder frame shell, three first clamping members respectively slidably mounted in respective sliding ways of the bottom holder frame shell for holding a mobile electronic device, a gear wheel rotatable to move the first clamping members in and out of the upper and bottom holder frame shells, a retractable second clamping member slidably mounted in one sliding way of the bottom holder frame shell and adjustable to one of a series of length.

2. Description of the Related Art

A mobile electronic device may be used in a motor vehicle to hold a mobile electronic device (such as iPad, iPhone, electronic book, tablet PC, etc.), facilitating reading and charging. As conventional mobile electronic devices are specifically designed for holding a particular mobile electronic device, different mobile electronic devices shall be used for holding different mobile electronic devices. It is not economic to prepare a set of mobile electronic device holders for selectively holding one of a number of different types or sizes of mobile electronic devices.

SUMMARY OF THE INVENTION

The present invention has been accomplished under the circumstances in view. It is one object of the present invention to provide a mobile electronic device holder, which is adjustable to hold different mobile electronic devices of different sizes.

To achieve this and other objects of the present invention, a mobile electronic device holder comprises an upper holder frame shell, which comprises a plurality of sliding rails extending in different directions, a bottom holder frame shell, which is attached to the bottom side of the upper holder frame shell, comprising four sliding ways respectively disposed at opposing front and rear sides and opposing lateral sides thereof, a plurality of border openings, a recessed bottom block located on the bottom side thereof, a pivoted catch and a handle connected to one end of the catch and operable to move the catch between a locking position and an unlocking position to lock/unlock a gear wheel, three first clamping members respectively slidably mounted in three of the four sliding ways of the bottom holder frame shell for holding a mobile electronic device, each first clamping members comprising a sliding groove respectively slidably coupled to the sliding rails of the upper holder frame shell, a gear wheel, which is rotatably supported between the upper holder frame shell and the bottom holder frame shell and peripherally partially protruding over the border openings of the bottom holder frame shell and lockable by the catch and rotatable to move the first clamping members inwardly and outwardly along the sliding rails, comprising three through holes and three links respectively pivotally connected between the through holes and the first clamping members, and a retractable second clamping member, which is slidably mounted in the other sliding way of the bottom holder frame shell, comprising a clamping head hinged to one end thereof for clamping a mobile electronic device on the first clamping members and a torsion spring supporting the clamping head in a predetermined position.

Further, each first clamping member comprises a smoothly arched clamping portion for holding a mobile electronic device. The clamping head of the retractable second clamping member defines a smoothly arched clamping portion for clamping a mobile electronic device on the first clamping members.

Further, the retractable second clamping member comprises a plurality of ratchet racks and a plurality of springy pawls for allowing adjustment of the length of a multi-segment retractable body thereof.

BRIEF DESCRIPTION OF THE DRAWINGS

FIG. 5 is another exploded view of the mobile electronic device holder in accordance with the present invention.

FIG. 6 is an oblique top elevation of an alternate form of the present invention.

FIG. 7 corresponds to FIG. 6 when viewed from another angle.

DETAILED DESCRIPTION OF THE PREFERRED EMBODIMENT

Figure 1:
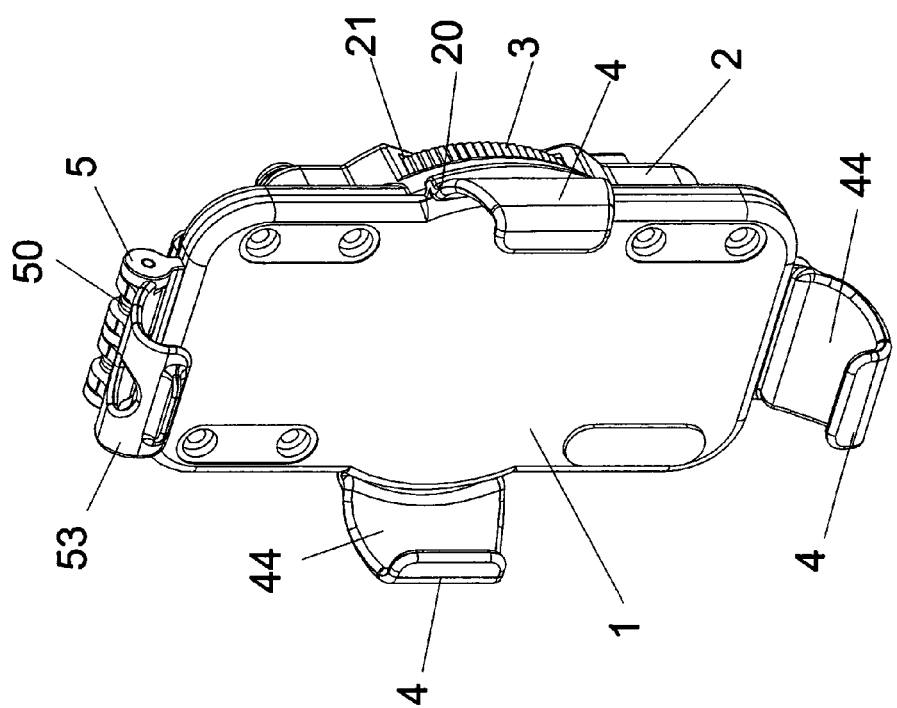
FIG. 1 is an elevational assembly view of a mobile electronic device holder in accordance with the present invention.
Figure 2:
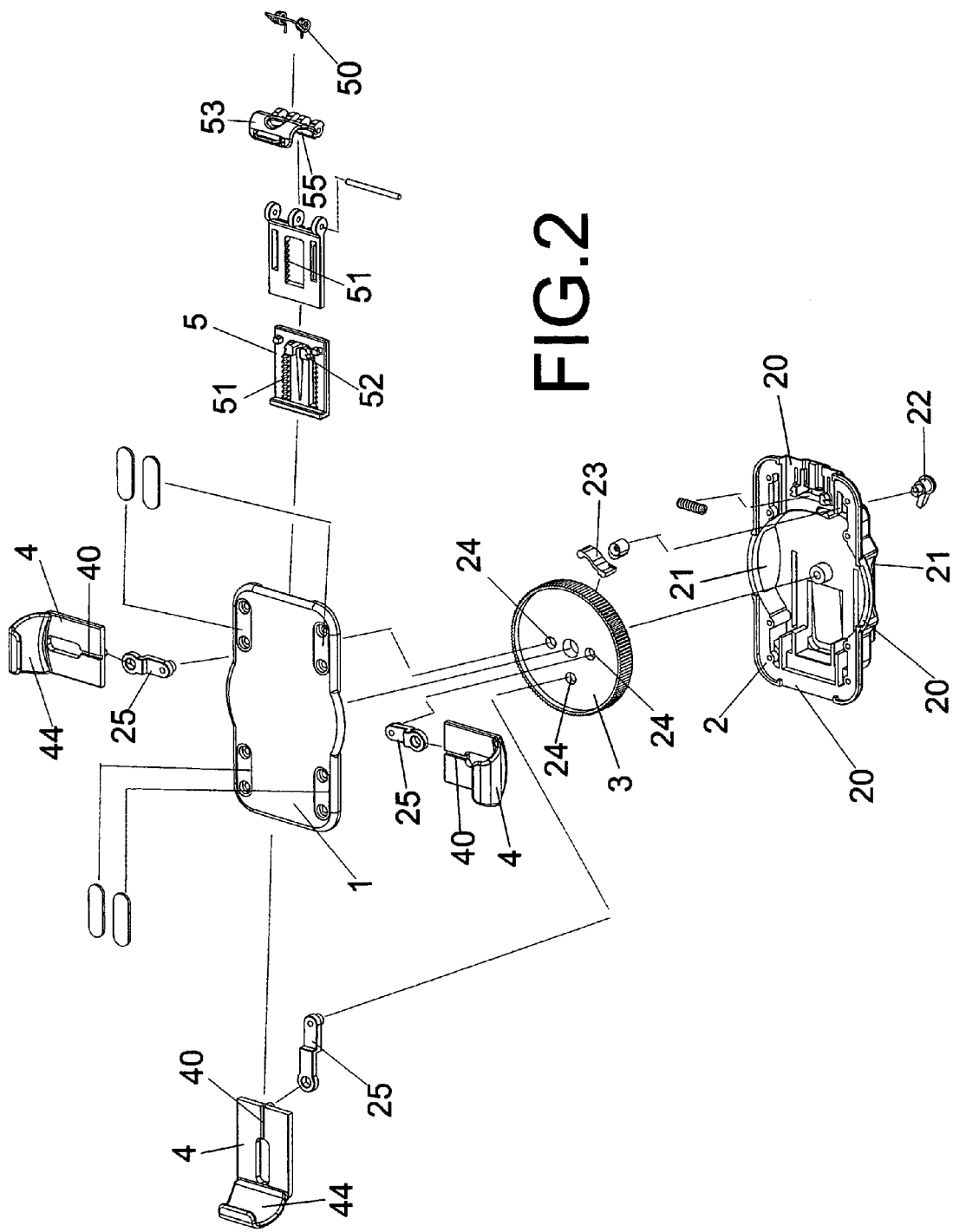
FIG. 2 is an exploded view of the mobile electronic device holder in accordance with the present invention.
Figure 3:
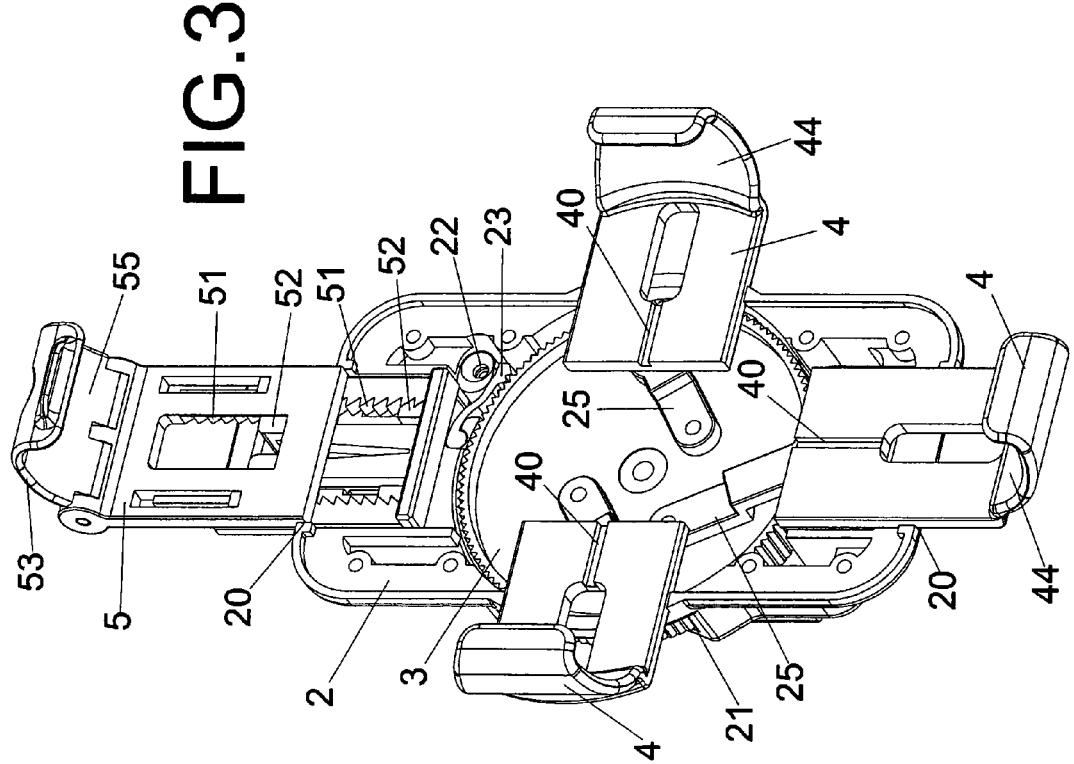
FIG. 3 is an elevational view of the mobile electronic device holder in accordance with the present invention after removal of the upper holder frame shell.
Figure 4:
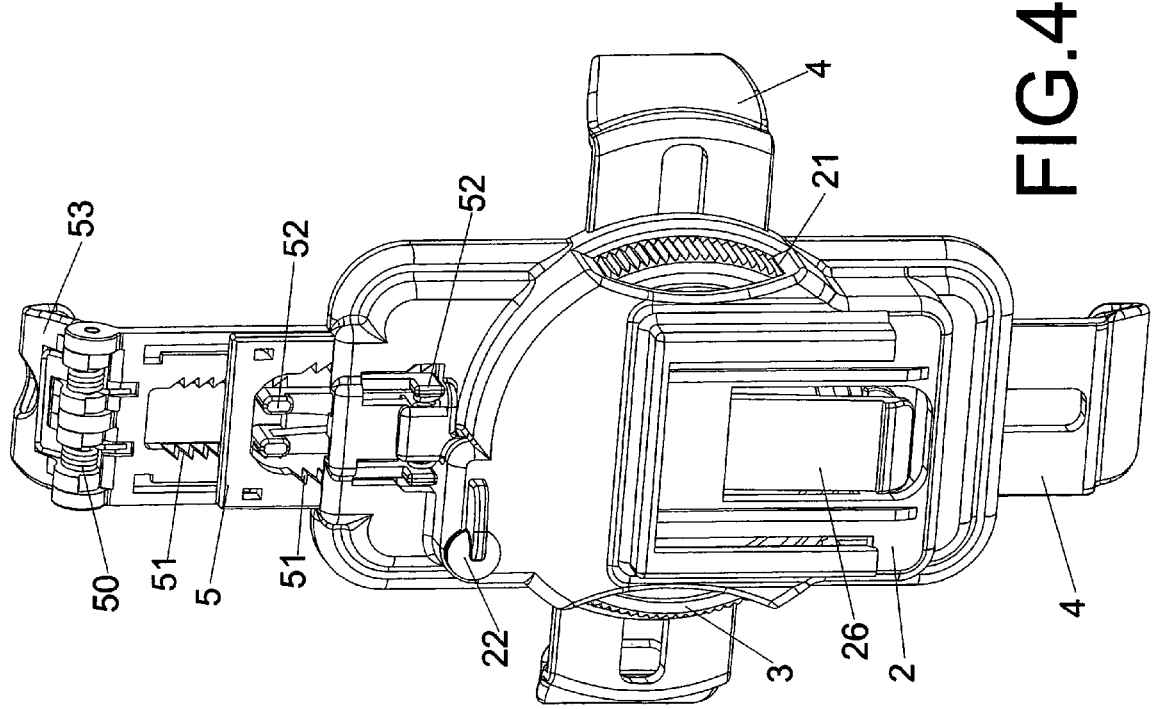
FIG. 4 corresponds to FIG. 3 when viewed from another angle.

Referring to FIGS. 1-6, a mobile electronic device holder in accordance with the present invention is shown. The electronic device holder comprises an upper holder frame shell 1, a bottom holder frame shell 2, a gear wheel 3, three first clamping members 4, and a retractable second clamping member 5.

The upper holder frame shell 1 comprises a plurality of sliding rails 10 extending in different directions.

The bottom holder frame shell 2 attached to the bottom side of the upper holder frame shell 1. The bottom holder frame shell 2 comprises four sliding ways 20 respectively disposed at opposing front and rear sides and opposing lateral sides thereof, a plurality of border openings 21, a recessed bottom block 26 located on the bottom side thereof, a pivoted catch 23, a handle 22 connected to one end of the catch 23 and operable to move the catch 23 between a locking position to lock the gear wheel 3 and an unlocking position to unlock the gear wheel 3.

The gear wheel 3 is rotatably supported on the top side of the bottom holder frame shell 2 and peripherally partially protruding over the border openings 21 of the bottom holder frame shell 2, comprising three through holes 24 and three links 25 respectively pivotally connected between the through holes 24 and the first clamping members 4.

The first clamping members 4 and the retractable second clamping member 5 are respectively slidably mounted in the sliding ways 20 of the bottom holder frame shell 2. Each of the first clamping members 4 comprises a sliding groove 40 respectively slidably coupled to the sliding rails 10 of the upper holder frame shell 1, and a smoothly arched clamping portion 44.

The retractable second clamping member 5 comprises a clamping head 53 hinged to one end thereof and supported in position by a torsion spring 50. The clamping head 53 defines a smoothly arched clamping portion 55. Further, the retractable second clamping member 5 has a multi-segment retractable body design. By means of ratchet racks 51 and springy pawls 52, the multi-segment retractable body of the retractable second clamping member 5 can be adjusted to one of a series of lengths.

When loading a mobile electronic device, disengage the springy pawls 52 for allowing the retractable second clamping member 5 to be adjusted to the longest condition, and then rotate the gear wheel 3 to move the links 25 in forcing the first clamping members 4 along the respective sliding rails 10 of the upper holder frame shell 1 toward the outside, and then attach the mobile electronic device to the first clamping members 4, and then rotate the gear wheel 3 in the reversed direction to move the first clamping members 4 toward the inside of the upper holder frame shell 1, causing the smoothly arched clamping portions 44 of the upper holder frame shell 1 to clamp on the mobile electronic device. Thereafter, push the springy pawls 52 to retract the retractable second clamping member 5, forcing the smoothly arched clamping portion 55 of the clamping head 53 into engagement with the loaded mobile electronic device. When going to remove the mobile electronic device from the mobile electronic device holder, extend the retractable second clamping member 5 to disengage the smoothly arched clamping portion 55 of the clamping head 53 from the mobile electronic device, and then remove the mobile electronic device from the mobile electronic device holder.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A mobile electronic device holder, comprising:
    an upper holder frame shell comprising a plurality of sliding rails extending in different directions;
    a bottom holder frame shell attached to a bottom side of said upper holder frame shell, said bottom holder frame shell comprising four sliding ways respectively disposed at opposing front and rear sides and opposing lateral sides thereof, a plurality of border openings, a recessed bottom block located on the bottom side thereof, a pivoted catch and a handle connected to one end of the catch and operable to move said catch between a locking position and an unlocking position to lock/unlock a gear wheel;
    three first clamping members respectively slidably mounted in three of said four sliding ways of said bottom holder frame shell for holding a mobile electronic device, each said first clamping members comprising a sliding groove respectively slidably coupled to said sliding rails of said upper holder frame shell;
    said gear wheel rotatably supported between said upper holder frame shell and said bottom holder frame shell and peripherally partially protruding over said border openings of said bottom holder frame shell and lockable by said catch, said gear wheel comprising three through holes and three links respectively pivotally connected between said through holes and said first clamping members, said gear wheel being rotatable to move said first clamping members inwardly and outwardly along said sliding rails;
    a retractable second clamping member slidably mounted in one said sliding way of said bottom holder frame shell, said retractable second clamping member comprising a clamping head hinged to one end thereof for clamping a mobile electronic device on said first clamping members, and a torsion spring supporting said clamping head in a predetermined position.

2. The mobile electronic device holder as claimed in claim 1, wherein each said first clamping member comprises a smoothly arched clamping portion for holding a mobile electronic device; said clamping head of said retractable second clamping member defines a smoothly arched clamping portion for clamping a mobile electronic device on said first clamping members.

3. The mobile electronic device holder as claimed in claim 1, wherein said retractable second clamping member comprises a plurality of ratchet racks and a plurality of springy pawls for allowing adjustment of the length of a multi-segment retractable body thereof.

* * * * *